US009872127B2

United States Patent
Mizumoto

(10) Patent No.: US 9,872,127 B2
(45) Date of Patent: Jan. 16, 2018

(54) MOBILE TERMINAL DEVICE, METHOD FOR CONTROLLING MOBILE TERMINAL DEVICE, AND RECORDING MEDIUM

(71) Applicant: KYOCERA Corporation, Kyoto (JP)

(72) Inventor: Akira Mizumoto, Nishinomiya (JP)

(73) Assignee: KYOCERA Corporation, Kyoto (JP)

( * ) Notice: Subject to any disclaimer, the term of this patent is extended or adjusted under 35 U.S.C. 154(b) by 159 days.

(21) Appl. No.: 14/835,583

(22) Filed: Aug. 25, 2015

(65) Prior Publication Data
US 2015/0365786 A1   Dec. 17, 2015

Related U.S. Application Data

(63) Continuation of application No. PCT/JP2014/054526, filed on Feb. 25, 2014.

(30) Foreign Application Priority Data

Feb. 25, 2013 (JP) .................................. 2013-034961

(51) Int. Cl.
H04B 1/38       (2015.01)
H04M 1/00       (2006.01)
(Continued)

(52) U.S. Cl.
CPC ....... *H04W 4/008* (2013.01); *H04M 1/27455* (2013.01); *H04M 1/72547* (2013.01); *H04M 2250/52* (2013.01)

(58) Field of Classification Search
CPC ......... H04M 1/27455; H04M 2250/02; H04W 4/008
(Continued)

(56) References Cited

U.S. PATENT DOCUMENTS

2007/0268309 A1* 11/2007 Tanigawa .......... H04M 1/27455
                                                              345/619
2008/0254783 A1* 10/2008 Kim ...................... H04M 1/576
                                                              455/418
(Continued)

FOREIGN PATENT DOCUMENTS

JP   2007-102683 A   4/2007
JP   2011-040865 A   2/2011
(Continued)

OTHER PUBLICATIONS

English Translation of JP2012199871 A in PDF form, Takeshita et al., dated Oct. 18, 2012.*
(Continued)

*Primary Examiner* — Ayodeji Ayotunde
(74) *Attorney, Agent, or Firm* — Procopio Cory Hargreaves and Savitch LLP

(57) ABSTRACT

A mobile phone includes a display module, an obtaining module configured to obtain an image, a storage module configured to associate and store person information and address information of a communicated device, a first extraction module configured to extract first address information corresponding to person information of at least one person included in the image from address information, a second extraction module configured to extract second address information corresponding to person information having a predetermined relationship with the person information of at least one person included in the image from address information, and a selection display executing module configured to display on the display module a selection screen for selection of at least one address information from the first address information and the second address information.

9 Claims, 15 Drawing Sheets

(51) Int. Cl.
*H04W 4/00* (2009.01)
*H04M 1/2745* (2006.01)
*H04M 1/725* (2006.01)

(58) Field of Classification Search
USPC .................................................. 455/41.2, 564
See application file for complete search history.

(56) References Cited

U.S. PATENT DOCUMENTS

| | | | | |
|---|---|---|---|---|
| 2011/0043643 | A1* | 2/2011 | Yu ..................... | H04N 1/00209 |
| | | | | 348/207.1 |
| 2011/0060799 | A1* | 3/2011 | Shimoda ........... | H04M 1/27455 |
| | | | | 709/206 |
| 2012/0321196 | A1* | 12/2012 | Tanigawa .......... | H04M 1/27455 |
| | | | | 382/195 |
| 2013/0204956 | A1 | 8/2013 | Shimoda | |

FOREIGN PATENT DOCUMENTS

| | | | | |
|---|---|---|---|---|
| JP | 2011-155385 A | | 8/2011 | |
| JP | 2012-199871 A | | 10/2012 | |
| JP | 2012199871 A | * | 10/2012 | ...... H04M 1/274583 |

OTHER PUBLICATIONS

Written Opinion of the International Searching Authority issued by Japan Patent Office for International Application No. PCT/JP2014/054526.

International Search Report dated May 27, 2014, issued for International Application No. PCT/JP2014/054526.

* cited by examiner

FIG.3

PHONE DIRECTORY TABLE 12a

| REGISTRATION NUMBER | NAME | RESIDENCE | REGISTERED IMAGE | GROUP | MASTER IMAGE | PHONE NUMBER | MAIL ADDRESS | PASS KEY |
|---|---|---|---|---|---|---|---|---|
| 001 | NAME A | ** * ** | * | FRIEND | * | xxx- xxxx- xxxx | @*.* | ****** |
| 002 | NAME B | ** * ** | * | FRIEND | * | xxx- xxxx- xxxx | @*.* | ****** |
| 003 | NAME C | ** * ** | * | FRIEND | * | xxx- xxxx- xxxx | @*.* | ****** |
| 004 | NAME D | ** * ** | * | FRIEND | * | xxx- xxxx- xxxx | @*.*** | |
| 005 | NAME E | ** * ** | | FRIEND | | | @*.*** | |
| 006 | NAME F | ** * ** | * | FRIEND | * | xxx- xxxx- xxxx | @*.* | ****** |
| 007 | NAME G | ** * ** | * | FRIEND | * | xxx- xxxx- xxxx | @*.* | ****** |
| 008 | NAME H | | * | COMPANY | * | xxx- xxxx- xxxx | **@*.*** | |
| 010 | NAME I | ** * ** | * | FRIEND | * | xxx- xxxx- xxxx | @*.* | ****** |
| 011 | NAME J | ** * ** | | COMPANY | | xxx- xxxx- xxxx | @*.*** | |
| 012 | NAME K | **** *** **** | *** | FAMILY | *** | xxx- xxxx- xxxx | | |
| 013 | NAME L | ** * ** | * | COMPANY | * | xxx- xxxx- xxxx | @*.* | ****** |
| ...... | ...... | ...... | ...... | ...... | ...... | ...... | ...... | ...... |

PERSON INFORMATION / ADDRESS INFORMATION

FIG.13
(a)
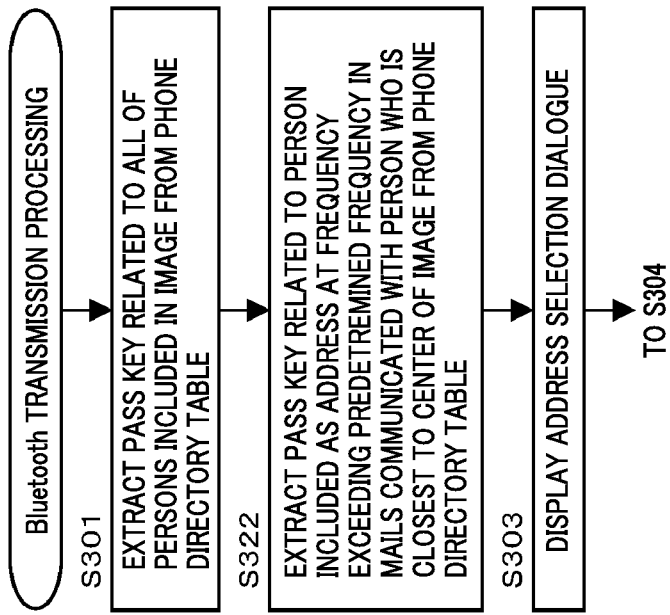
(b)
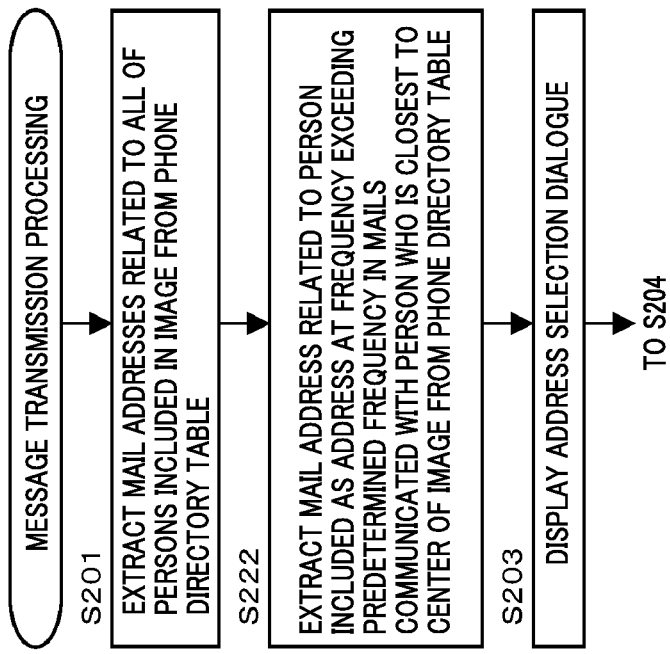

FIG.14
(a)
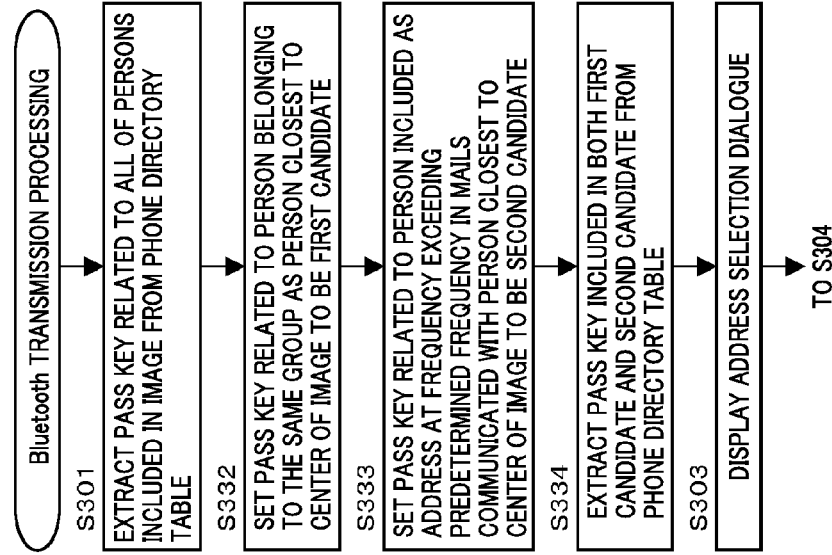
(b)
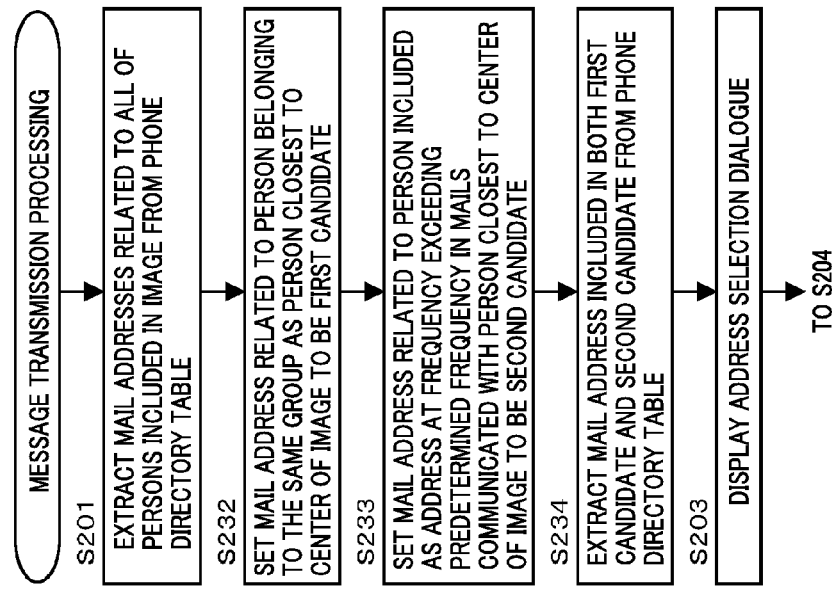

FIG.15
(a)
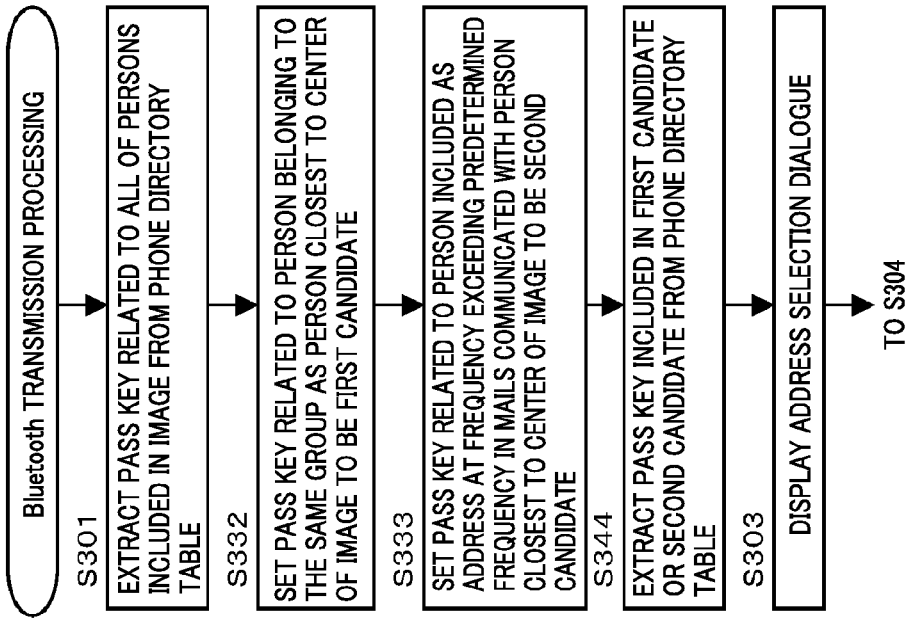
(b)
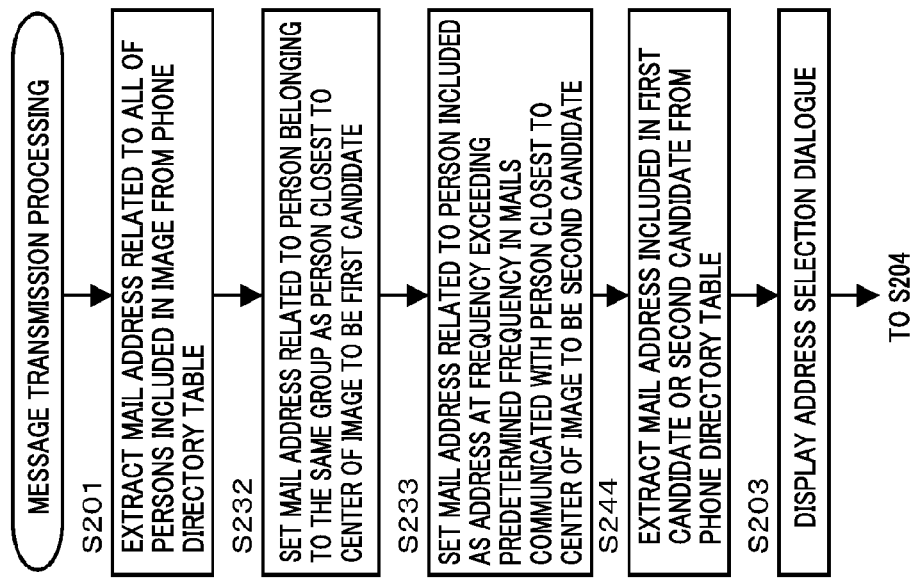

MOBILE TERMINAL DEVICE, METHOD FOR CONTROLLING MOBILE TERMINAL DEVICE, AND RECORDING MEDIUM

CROSS-REFERENCE TO RELATED APPLICATION

The present application is a continuation in part based on PCT Application No. PCT/JP2014/054526 filed on Feb. 25, 2014, which claims the benefit of Japanese Application No. 2013-034961, filed on Feb. 25, 2013. PCT Application No. PCT/JP2014/054526 is entitled "Mobile Terminal Apparatus And Mobile Terminal Apparatus Control Method", and Japanese Application No. 2013-034961 is entitled "Mobile Terminal Device and Method for Controlling Mobile Terminal Device". The content of which are incorporated by reference herein in their entirety.

FIELD

The present disclosure relates to mobile terminal devices such as a mobile phone, a PDA (Personal Digital Assistant), a tablet PC, an electronic book terminal, and the like. Moreover, the present disclosure relates to a control method which is suitable for use in the mobile terminal devices.

BACKGROUND

Conventionally, there has been a known digital camera which extracts a face image from an image by means of a face recognition technique, obtains from a table memory an electronic mail address of a person specified from information representing characteristics of the extracted image, and transmits the image to a communication device having the obtained electronic mail address.

SUMMARY

A mobile terminal device according to a first embodiment of the present disclosure comprises a display module, an obtaining module configured to obtain an image, a storage module configured to associate and store person information and address information of a communicated device, a first extraction module configured to extract first address information corresponding to person information of at least one person included in the image from address information, a second extraction module configured to extract second address information corresponding to person information having a predetermined relationship with the person information of at least one person included in the image from address information, and a selection display executing module configured to display on the display module a selection screen for selection of at least one address information from the first address information and the second address information.

In the mobile terminal device according to one embodiment, the person information may include a face image. In this case, the first extraction module extracts address information corresponding to a face image of at least one person included in the image.

The mobile terminal device according to the one embodiment may be configured to further comprise a communication module configured to communicate with the communicated device, and a transmission processing executing module configured to transmit the image to a communicated device corresponding to predetermined address information when the predetermined address information is selected at the selection screen.

In the case with such a configuration, before transmitting the image, the transmission processing executing module displays on the display module a message creating screen to which the predetermined address information is inputted and the image is attached.

Alternatively, in the case with such a configuration described above, the communication module performs a communication with the communicated device by means of a short distance communication module. Moreover, the address information may include information for performing the short distance wireless communication. In this case, the transmission processing executing module transmits the image through the short distance wireless communication.

In the mobile terminal device according to the one embodiment, the person information may include group information. In this case, the second extraction module extracts address information, corresponding to person information belonging to the same group information as group information to which person information corresponding to the first address information belongs, as the second address information.

In the mobile terminal device according to one embodiment, the memory module stores a communication history by between the mobile terminal device and the communicated device. In this case, the second extraction module extracts address information corresponding to person information, which is included at a frequency exceeding a predetermined frequency as an address in the communication history between the mobile terminal device and the communicated device of address information corresponding to person information of at least one person included in the image, as the second address information.

A second embodiment of the present disclosure relates to a method for controlling a mobile terminal device including a display module. The control method according to one embodiment comprises the steps of obtaining an image, associating and storing person information and address information of a communicated device, extracting first address information corresponding to person information of at least one person included in the image from the address information, extracting second address information corresponding to person information having a predetermined relationship with the person information of at least one person included in the image from the address information, and displaying on the display module a selection screen for selection of at least one address information from the first address information and the second address information.

A third embodiment of the present disclosure relates to a recording medium recording, in a computer-readable manner, a program for allowing a computer to execute the control method described above.

According to the present disclosure, a mobile terminal device and a method for controlling a mobile terminal device can be provided which are capable of providing a user with useful address information based on an image including a person.

The effect and significance of the present disclosure will be more apparent from the following description of the embodiments. It should be noted that the following embodiments are mere examples of implementation of the present disclosure, and the present disclosure is not at all limited to the disclosure of the following embodiments.

BRIEF DESCRIPTION OF THE DRAWINGS

FIG. 3 represents a configuration of a phone directory table.

FIG. 13 is a flowchart representing the message transmission processing and Bluetooth transmission processing.

FIG. 14 is a flowchart representing the message transmission processing and Bluetooth transmission processing.

FIG. 15 is a flowchart representing the message transmission processing and Bluetooth transmission processing.

DETAILED DESCRIPTION

In a digital camera which obtains from a table memory an electronic mail address of a person included in an image and transmits an image to a communication device having the obtained electronic mail address, the obtained electronic mail address is limited to an electronic mail address of a person (a communication device owned by the person) included in the image. Therefore, when an image is transmitted to a person related to a person included in the image, for example, when the person included in the image is a user's friend, and the image is transmitted to other friend of the user, the user must manually input an electronic mail address of the friend separately. Even when a phone directory function (application) is provided in the digital camera, a separate operation of obtaining an electronic mail address of the friend from the phone directory must be performed. Such an operation may bother a user.

Therefore, it is desired to provide a mobile terminal device and a method for controlling a mobile terminal device which are capable of providing a user with useful address information based on an image including a person.

Hereinafter, embodiments of the present disclosure will be described with reference to the drawings.

Figure 1:
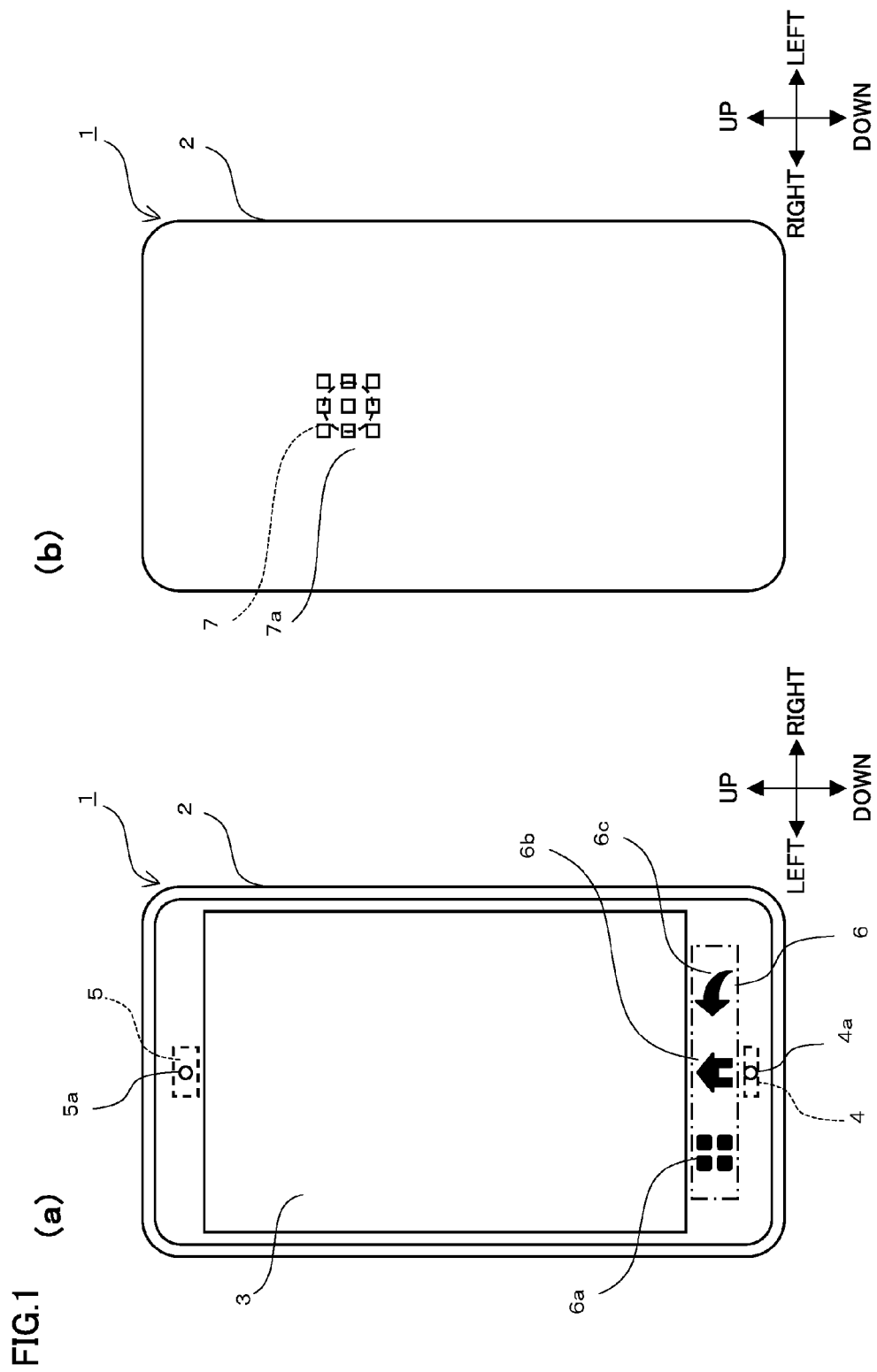
FIG. 1 represents a configuration of a mobile phone.

FIG. 1 represents a configuration of a mobile phone 1. FIGS. 1(a) and 1(b) are a front view and a rear view, respectively.

In the following, for convenience of description, as shown in FIG. 1, a longitudinal direction of a cabinet 2 is defined as an upward/downward direction, and a short direction of cabinet 2 is defined as a leftward/rightward direction.

Mobile phone 1 includes cabinet 2, a display surface 3, a microphone 4, a phone call speaker 5, a key operation module 6, and an external speaker 7.

Cabinet 2 has a substantially rectangular contour when viewed from a front face. Display surface 3 of a display module 13, which will be described later, is arranged on a front face of cabinet 2. Various images (screens) are displayed on display surface 3.

In cabinet 2, microphone 4 is arranged at a lower end portion, and phone call speaker 5 is arranged at an upper end portion. A voice is inputted to microphone 4 through a microphone hole 4a formed in the front face of cabinet 2. Microphone 4 generates an electric signal in accordance with an inputted sound. A voice is outputted from phone call speaker 5. The outputted voice is discharged to outside through an output hole 5a formed in the front face of cabinet 2.

On the front face of cabinet 2, key operation module 6 is provided. Key operation module 6 includes a setting key 6a, a home key 6b, and a back key 6c. Setting key 6a is a key configured to mainly display on display surface 3 a setting screen for various settings. Home key 6b is a key configured to mainly display on display surface 3 a home screen. Back key 6c is a key configured to return an executed processing to a previous processing by one step.

In cabinet 2, external speaker 7 is arranged. On a back face of cabinet 2, output holes 7a corresponding to external speaker 7 are formed. A sound (a voice, an informing sound, and the like) outputted from external speaker 7 is discharged to outside through output holes 7a.

Figure 2:
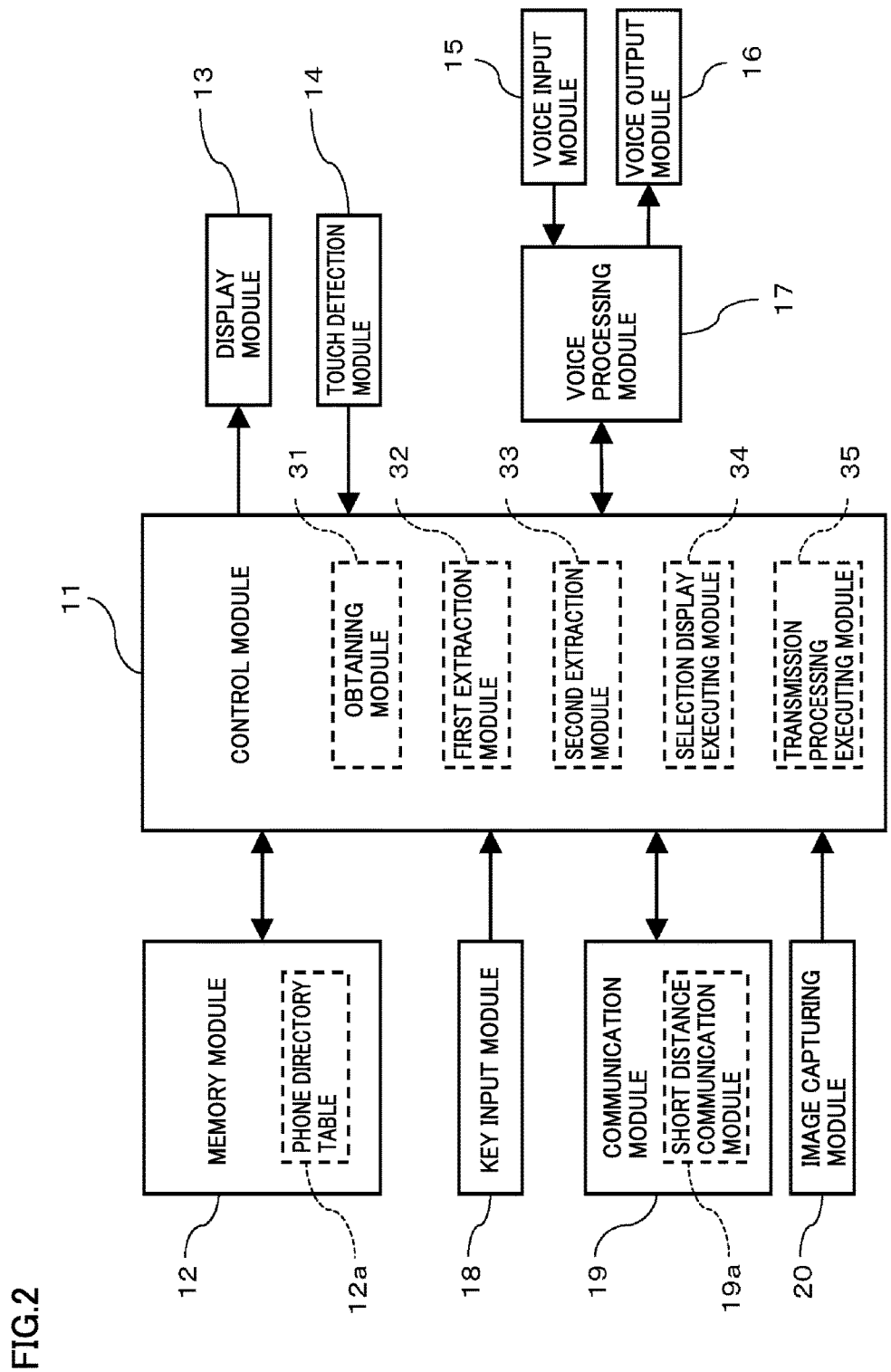
FIG. 2 is a block diagram representing an overall configuration of the mobile phone.

FIG. 2 is a block diagram representing an overall configuration of mobile phone 1. Mobile phone 1 includes a control module 11, a memory module 12, a display module 13, a touch detection module 14, a voice input module 15, a voice output module 16, a voice processing module 17, a key input module 18, a communication module 19, and an image capturing module 20.

Memory module 12 includes an ROM, an RAM, an external memory, and the like. Memory module 12 stores various programs. The programs stored in memory module 12 include a control program for controlling each module of mobile phone 1 and otherwise include various applications (for example, a phone, an electronic mail, a phone directory, a map, a game, a schedule management, and the like). The programs are stored in memory module 12 by a manufacturer at the time of manufacturing mobile phone 1 and otherwise stored in memory module 12 by a user through a communication network or a storage medium such as a memory card.

Memory module 12 also includes a working area, which is not illustrated in the drawing, configured to store data temporarily used or generated at the time of executing a program.

Control module 11 is constituted of a CPU and the like. Control module 11 controls each module (memory module 12, display module 13, touch detection module 14, voice input module 15, voice output module 16, voice processing module 17, key input module 18, communication module 19, image capturing module 20, and the like) constituting mobile phone 1 in accordance with a program.

Display module 13 is constituted of a liquid crystal display and the like. Display module 13 displays an image (screen) on display surface 3 based on a control signal and an image signal from control module 11. Display module 13 may be constituted not only of a liquid crystal display but also of other display device such as an organic electroluminescence display or the like.

Touch detection module 14 is constituted of a touch panel or the like configured to detect a touch of a finger to display surface 3. The touch panel is formed to be a transparent sheet and arranged on the front face of cabinet 2 so as to cover display surface 3. The touch panel may be a touch panel of various types such as an electrostatic capacity type, an ultrasonic wave type, a pressure-sensitive type, a resistance film type, an optical detection type, and the like.

Touch detection module 14 receives a touch operation performed by a user with respect to display surface 3. In other words, touch detection module 14 detects a position on display surface 3 where a finger is touched, in other words, a touch position, and outputs a position signal in accordance with the detected touch position to control module 11.

A user can perform various touch operations by touching display surface 3 with a finger. Kinds of touch operations include a tap operation, a flick operation, a slide operation, and the like. The tap operation is an operation in which a user touches display surface 3 with a finger and releases the finger from display surface 3 within a short period of time. The flick operation is an operation in which a user flicks display surface 3 with a finger in any direction. The slide operation is an operation in which a user holds a finger being touched to display surface 3 and moves it in any direction. The flick operation and the slide operation are touch operations involving a movement of a touch position.

The touch operation will be described more specifically. For example, after a touch position to display surface 3 is detected by touch detection module 14, when a touch position is not detected within a predetermined first time period, control module 11 determines that the tap operation was performed. After a touch position to display surface 3 is detected by touch detection module 14, and the touch position is moved longer than or equal to a predetermined first distance within a predetermined second time period, when a touch position is not detected, control module 11 determines that the flick operation was performed. After a touch position to display surface 3 is detected by touch detection module 14, when the touch position is moved longer than or equal to a predetermined second distance, control module 11 determines that the slide operation was performed.

Voice input module 15 is constituted of microphone 4 and the like. Voice input module 15 outputs an electric signal from microphone 4 to voice processing module 17.

Voice output module 16 includes phone call speaker 5 and external speaker 7. An electric signal from voice processing module 17 is inputted to voice output module 16, and a sound (a voice, an informing sound, and the like) is outputted from phone call speaker 5 or external speaker 7.

Voice processing module 17 applies an A/D conversion and the like to the electric signal from voice input module 15 and outputs a converted digital voice signal to control module 11. Voice processing module 17 applies a decoding processing, a D/A conversion, and the like to the digital voice signal from control module 11 and outputs the converted electric signal to voice output module 16.

When each operation key of key operation module 6 is pressed, key input module 18 outputs a signal in accordance with the pressed operation key to control module 11.

Communication module 19 includes a circuit for converting a signal, an antenna for communicating a radio wave, and the like to perform a telephone call or a communication. Communication module 19 can convert the signal inputted from control module 11 for a telephone call and a communication into a radio signal, and can transmit the converted radio signal to a destination of communication such as a base station, other communication device, or the like through the antenna. Further, communication module 19 can convert the radio signal received through the antenna into a signal of a type which can be used by control module 11 and can output the converted signal to control module 11.

Communication module 19 includes a short distance communication module 19*a* configured to perform a communication by means of Bluetooth (registered trademark), which is a standard for a short distance wireless communication, with other communication device. To perform the Bluetooth communication with other communication device, a paring for establishing a communication authentication between devices is required. A pass key (authentication key) is inputted between mobile phone 1 and other communication device. After the pairing is completed, the pass key is used at the time of communication for the next time. Accordingly, a channel for the Bluetooth communication is established automatically between mobile phone 1 and the communication device. The communication device for which the pairing is performed is registered as a trusted device, and the pass key and identification number of the communication device are registered to a registration table (not illustrated) in memory module 12.

Image capturing module 20 is constituted of an image capturing element such as a CCD, a CMOS sensor, or the like configured to capture an image of a photographic object, an A/D conversion circuit configured to apply the A/D conversion to a signal outputted from the image capturing element, a correction circuit configured to apply correction such as gamma correction or the like to the signal applied with the A/D conversion, and the like. Image capturing module 20 transmits digital data representing an image generated by capturing, in other words, image data to control module 11.

Memory module 12 stores a phone directory table 12*a* shown in FIG. 3. Contact information of a person as a communication counterpart is registered in phone directory table 12*a*. The contact information includes person information, such as a name, a residence, a registered image associated with a person, a group (a company, a family, a friend, and the like) to which a person belongs, a master image including a face image of a person, and the like, and address information of a communication device owned by the person, such as a phone number, a mail address, a pass key, and the like. Each contact information is provided with a registration number.

A face image included in a master image is used for matching with a face image included in an image selected by a user in an image transmission/edition processing which will be described later. A pass key is used for the Bluetooth communication described above.

Information inputted by a user as contact information is registered to phone directory table 12*a*. Among information included in the contact information, information not inputted by a user is not registered to phone directory table 12*a*. For example, when a phone number is not inputted, the phone number is not registered to phone directory table 12*a*.

An image folder set in memory module 12 stores an image (image data) captured by image capturing module 20 and an image obtained from other communication device, a website, or the like through communication module 19. There is a case where a user transmits an image stored in the image folder and including a captured image of a person to the person included in the image (a communication device owned by the person). At this time, when it is not only the person included in the image, but also a person related to that person, for example, when the person is a user's friend, a case is conceivable where the image is transmitted to other friend of the user.

Moreover, there is a case where a user changes a registered image registered in phone directory table 12a to a desired image in the image folder.

Mobile phone 1 of one embodiment includes an image transmission function for transmitting an image selected from a screen representing a list of images (thumbnails) to other communication device by means of an electronic mail or Bluetooth. In the image transmission function, address information (a mail address, a pass key, and the like) of a person included in an image and other person having a predetermined relationship with that person is extracted from phone directory table 12a based on the image and provided to a user by means of an address selection dialogue constituted of a list of address candidates. A user can select a desired address from the address selection dialogue to transmit an image to communication device having the selected address.

Moreover, mobile phone 1 of one embodiment has an image edition function of changing a registered image registered in phone directory table 12a into an image selected from a list screen.

Control module 11 executes a control processing related to the image transmission function and image edition function (hereinafter, referred to as "image transmission/edition processing") in accordance with a program.

Control module 11 includes an obtaining module 31, a first extraction module 32, a second extraction module 33, a selection display executing module 34, and a transmission processing executing module 35. Obtaining module 31, first extraction module 32, second extraction module 33, selection display executing module 34, and transmission processing executing module 35 are achieved as functions of a program executed by control module 11.

Obtaining module 31 can obtain from the image folder an image selected by a user from the list screen.

First extraction module 32 can extract, from address information (a mail address, a pass key) stored in phone directory table 12a of memory module 12 for each person, address information related to a person (person information) included in the image obtained by obtaining module 31, in other words, address information corresponding to a face image included in the obtained image. More specifically, first extraction module 32 can extract address information corresponding to a face image included in an image based on a result of matching between a face image included in an image and a face image included in a master image associated with address information.

Second extraction module 33 can extract, from address information (a mail address, a pass key) stored in phone directory table 12a, address information related to a person (person information) having a predetermined relationship with a person (person information) included in the image. More specifically, second extraction module 33 can extract address information related to a person (person information) belonging to the same group as a person (person information) included in an image in phone directory table 12a as address information of a person having a predetermined relationship.

Selection display executing module 34 can allow display module 13 to display a selection screen for selection of any address information extracted by first extraction module 32 and second extraction module 33, in other words, a browsing screen including an address selection dialogue which will be described later.

Transmission processing executing module 35 can perform a processing to transmit an image through communication module 19 to a communication device corresponding to the address information selected at the selection screen. More specifically, transmission processing executing module 35 can allow display module 13 to display a message creating screen to which a mail address selected at the selection screen is inputted and an image is attached. Alternatively, transmission processing executing module 35 can transmit by means of the Bluetooth communication an image to communication device corresponding to a pass key selected by a user.

Figure 4:
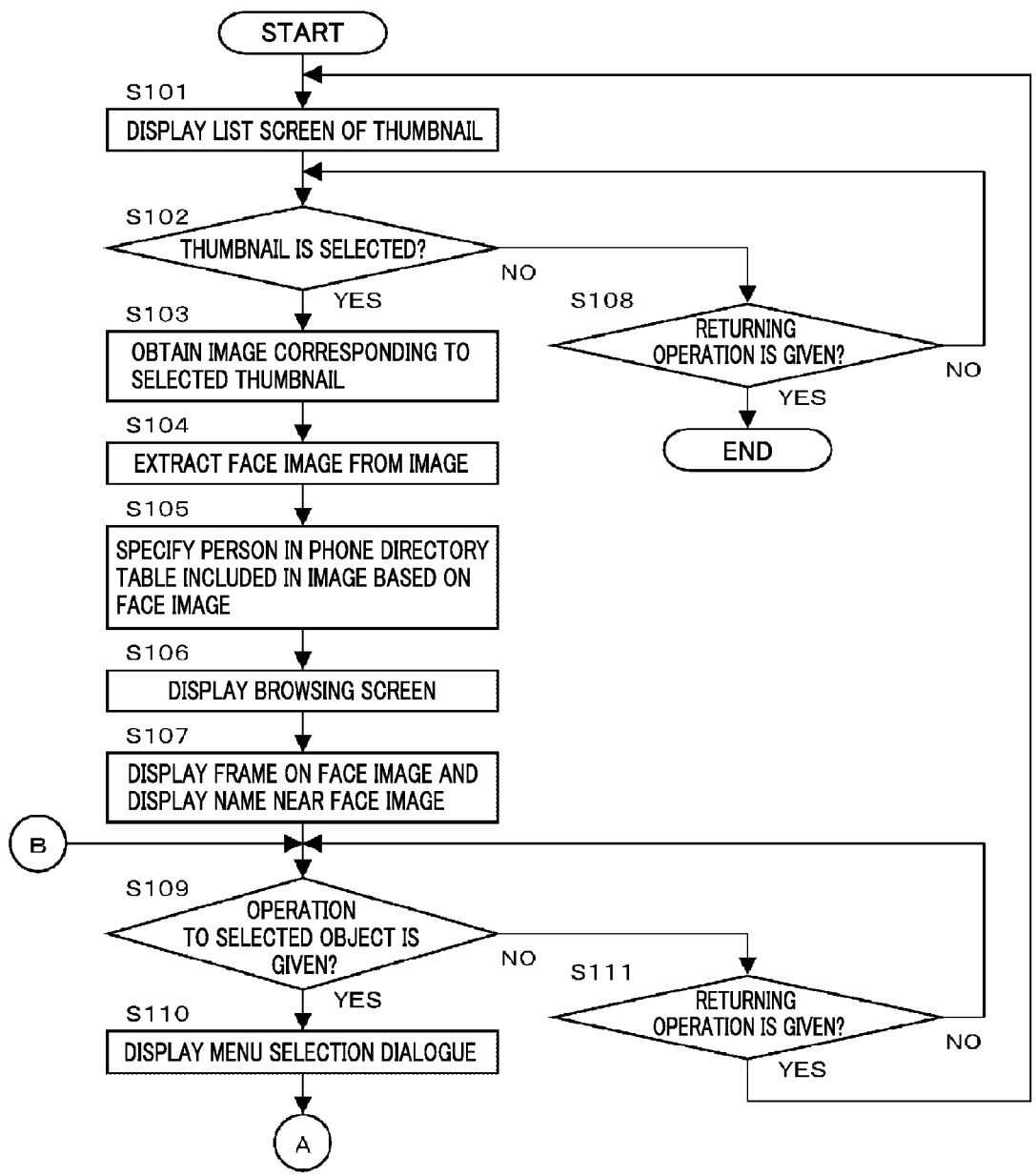
FIG. 4 is a flowchart representing an image transmission/edition processing.
Figure 5:
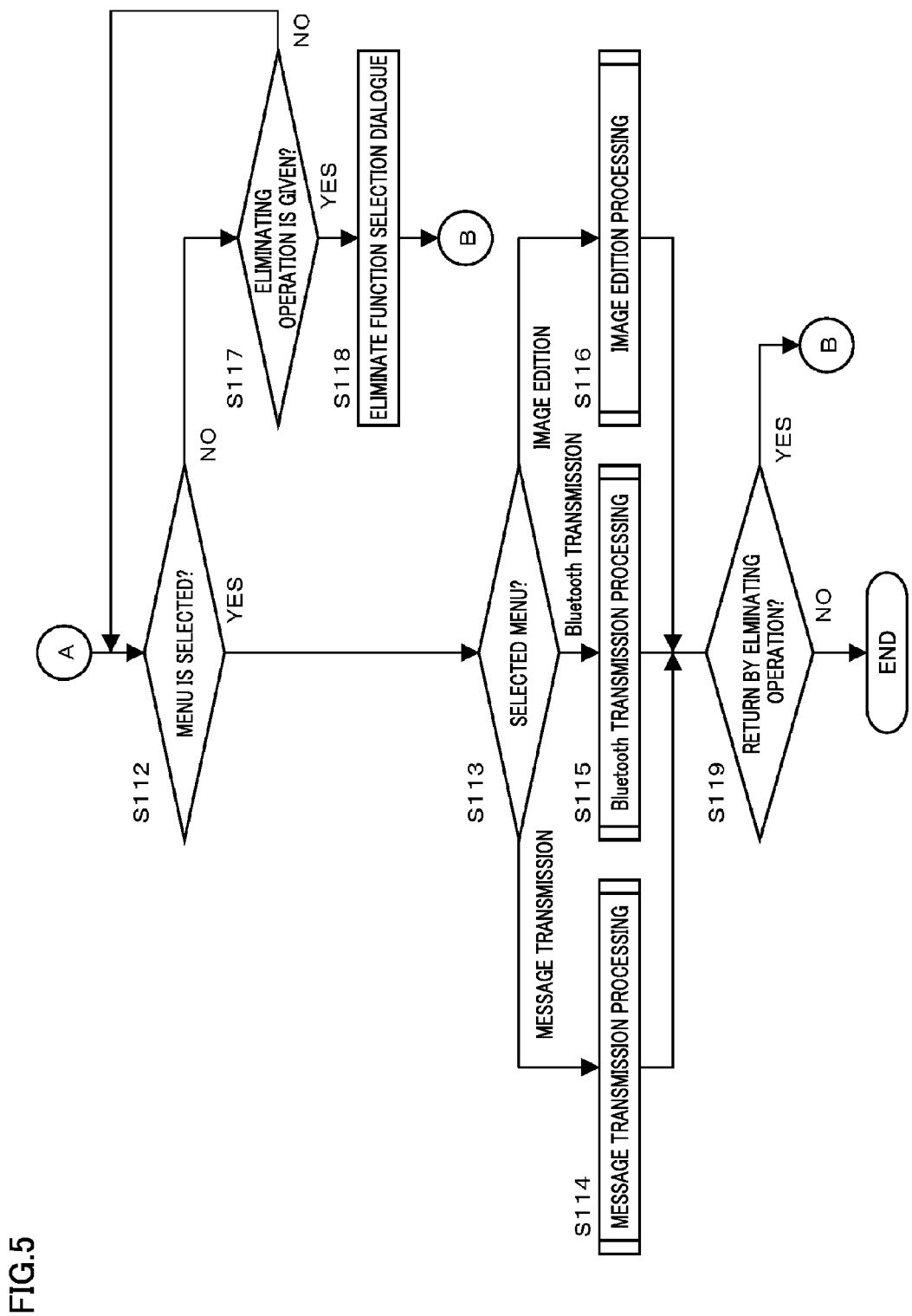
FIG. 5 is a flowchart representing an image transmission/edition processing.
Figure 6:
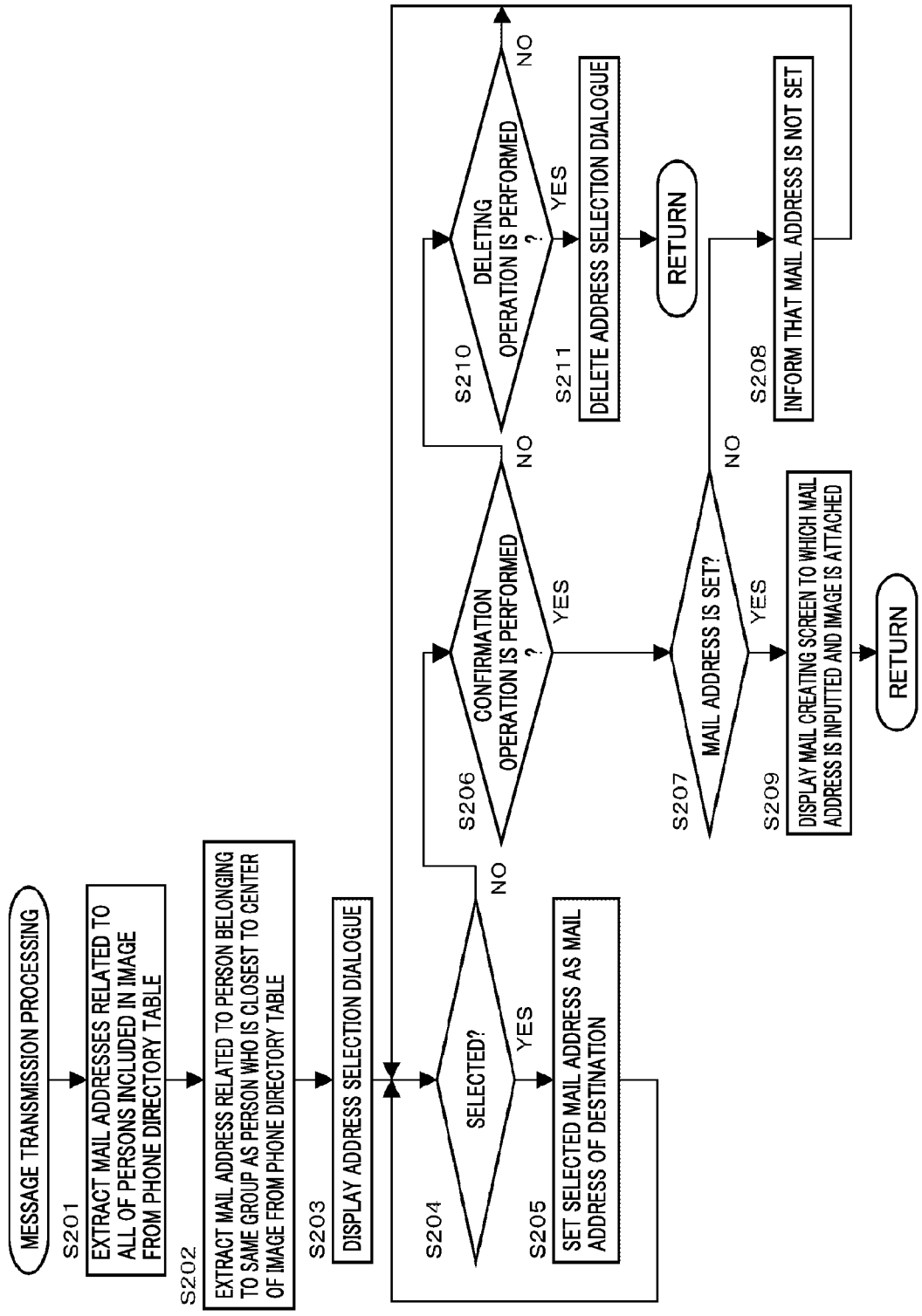
FIG. 6 is a flowchart representing a message transmission processing included in the image transmission/edition processing.
Figure 7:
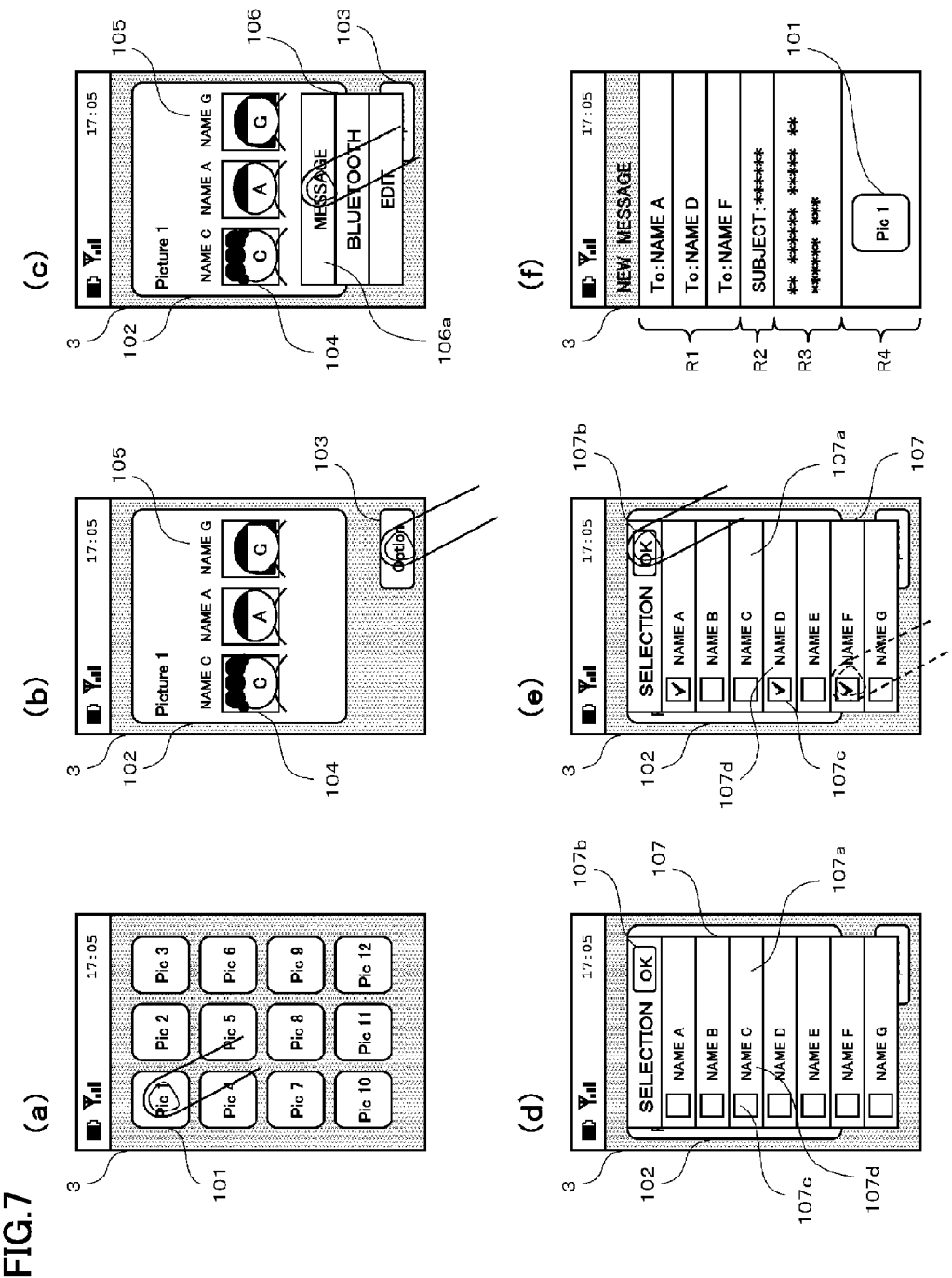
FIG. 7 represents screen transitions in the case where the message transmission processing is performed.
Figure 8:
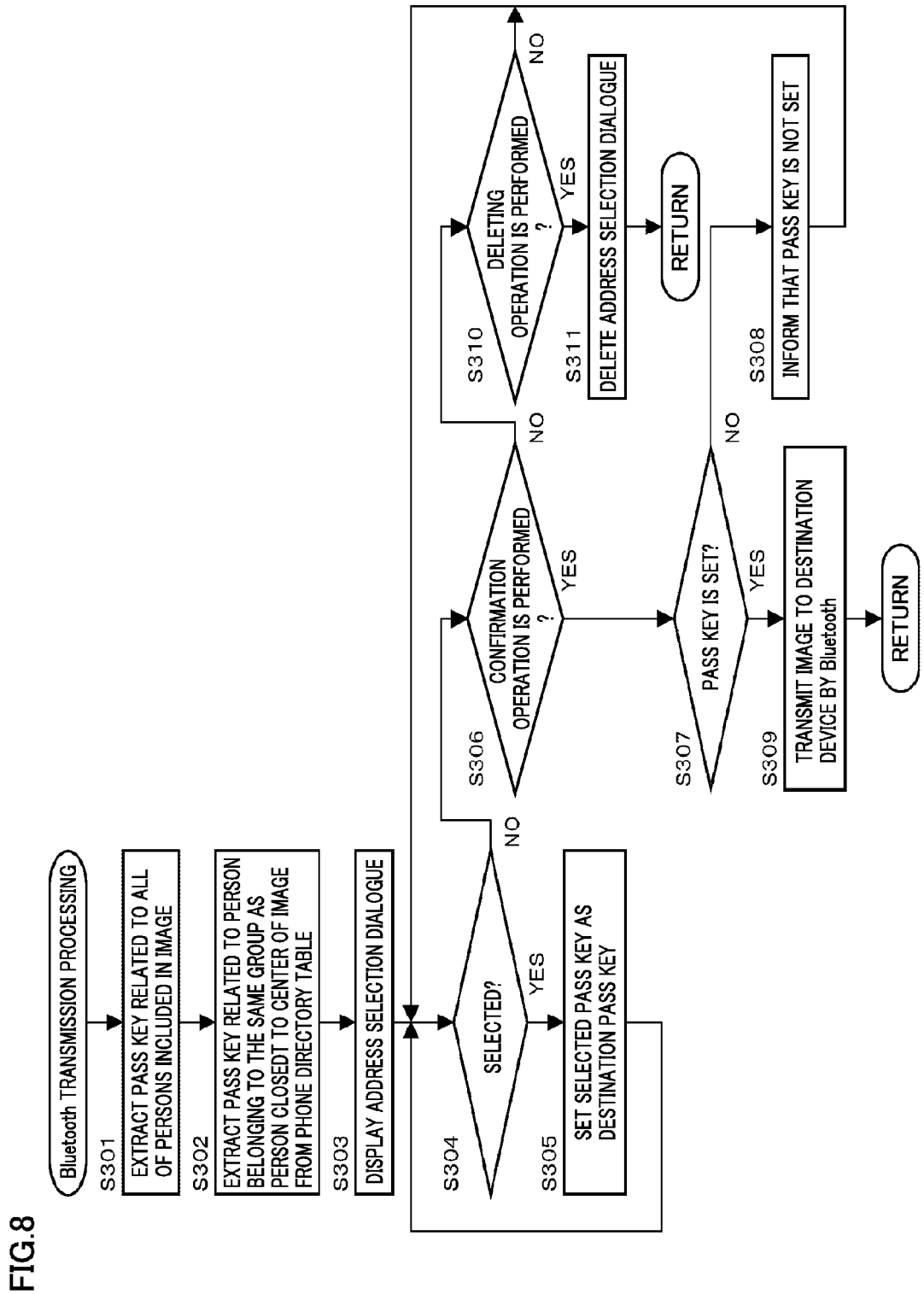
FIG. 8 is a flowchart representing a Bluetooth transmission processing included in the image transmission/edition processing.
Figure 9:
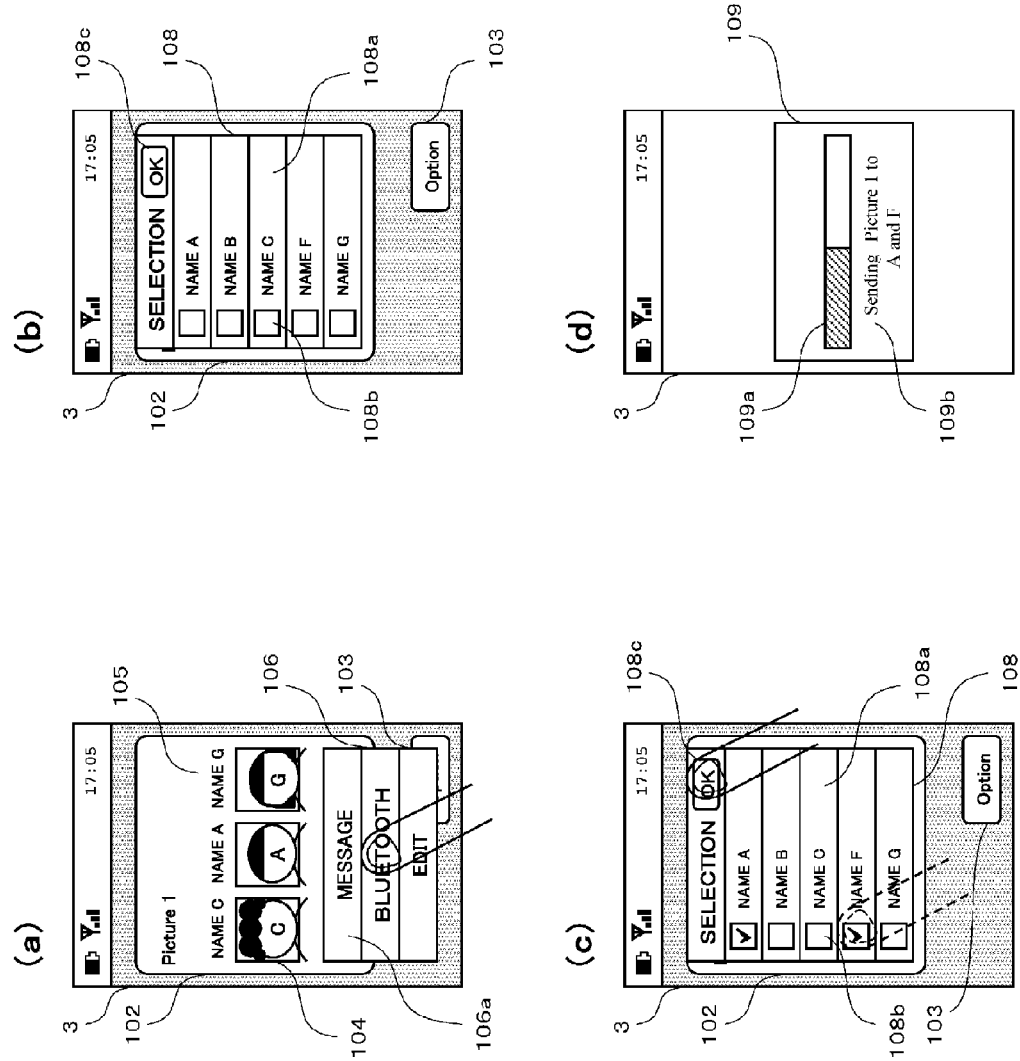
FIG. 9 represents screen transitions in the case where the Bluetooth transmission processing is performed.
Figure 10:
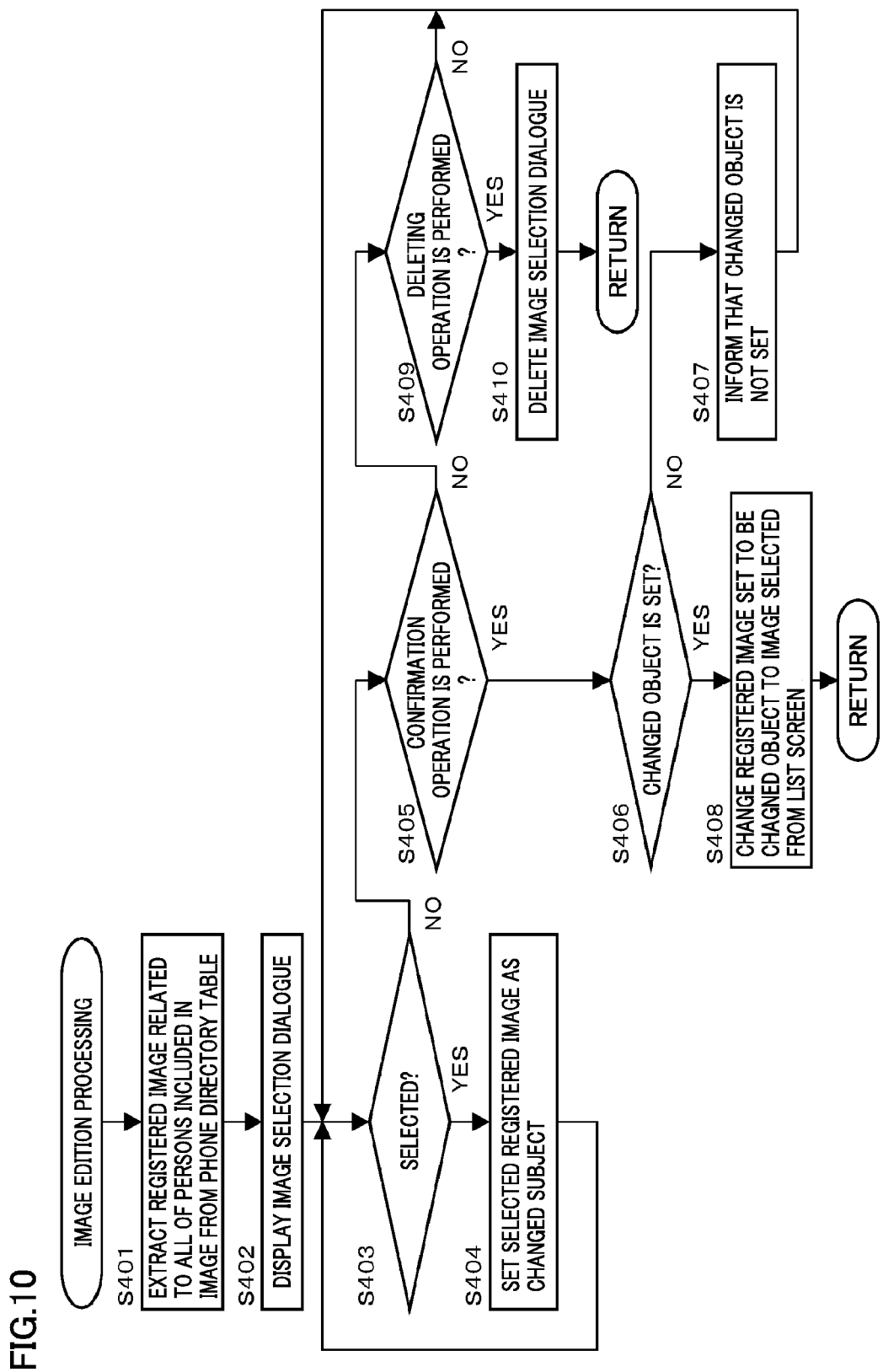
FIG. 10 is a flowchart representing an image edition processing included in the image transmission/edition processing.
Figure 11:
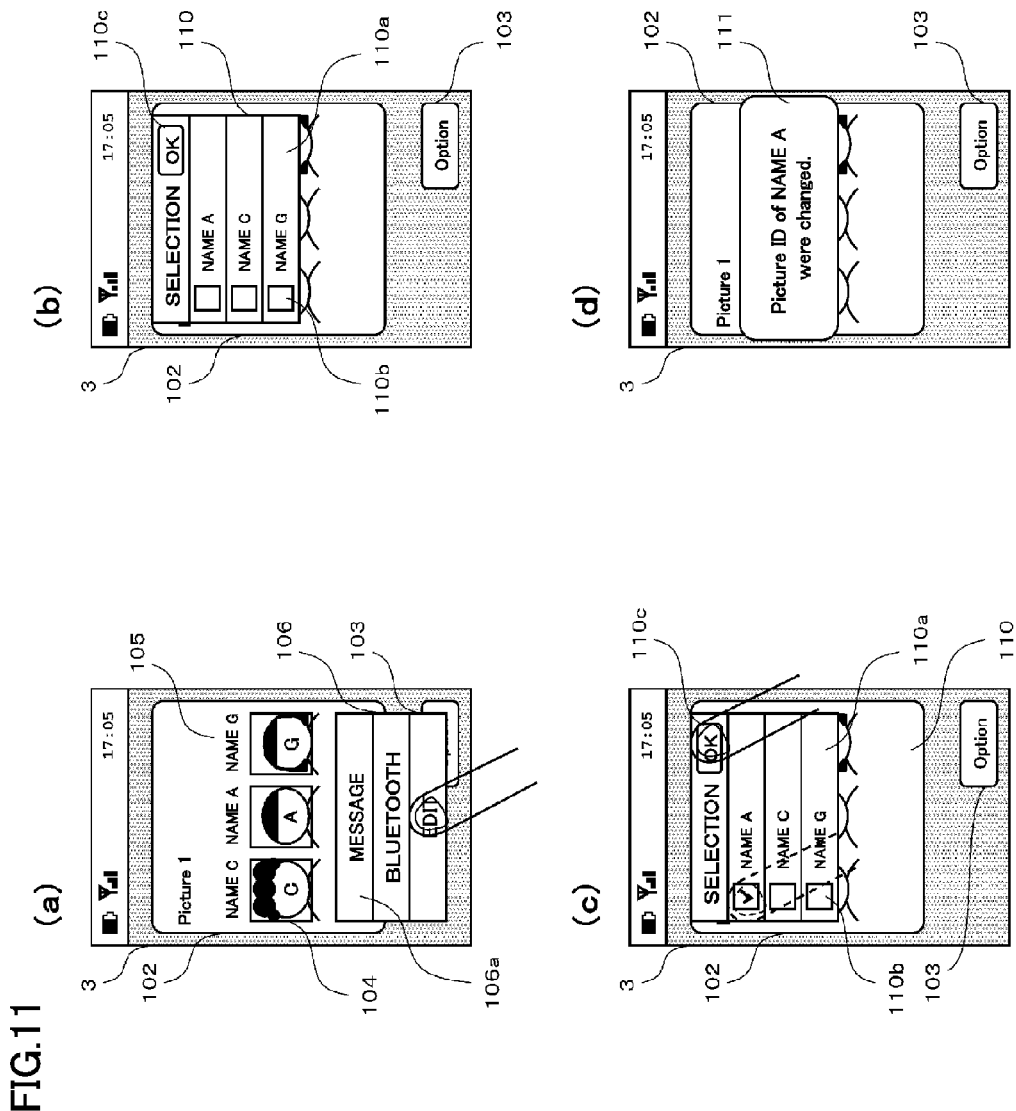
FIG. 11 is represents screen transitions in the case where the image edition processing is performed.

FIGS. 4 and 5 are flowcharts representing the image transmission/edition processing. FIG. 6 is a flowchart representing the message transmission processing included in the image transmission/edition processing. FIG. 7 represents screen transitions in the case where the message transmission processing is performed. FIG. 8 is a flowchart representing the Bluetooth transmission processing included in the image transmission/edition processing. FIG. 9 represents a screen transitions in the case where the Bluetooth transmission processing is performed. FIG. 10 is a flowchart representing the image edition processing included in the image transmission/edition processing. FIG. 11 represents screen transitions in the case where the image edition processing is performed.

When the image transmission/edition processing is started based on a predetermined operation performed by a user, control module 11 creates thumbnails 101 of images stored in the image folder and displays on display surface 3 a list screen of thumbnails 101 as shown in FIG. 7(*a*) (S101).

A user selects a thumbnail 101 of a desired image from the list screen by the tap operation. When thumbnail 101 is selected from the list screen (S102: YES), control module 11 (obtaining module 31) obtains from an image file an image corresponding to the selected thumbnail 101 (S103).

Control module 11 executes a face recognition processing to extract a face image from the obtained image (S104). For example, control module 11 detects a skin color in the obtained image and further detects characterizing portions such as eyes, a nose, a mouth, and the like based on shades and the like of the image to extract the face image. When a plurality of face images are present in the image, control module 11 extracts all of the face images.

Next, based on the extracted face image, control module 11 specifies a person included in the image and registered in phone directory table 12a (S105). For example, control module 11 extracts from the face image parameters for characterizing the face image. For example, the parameters include a shape of each part, such as eyes, a nose, a mouth, and the like, a ratio of a space between each parts, skin color, and the like. Further, control module 11 similarly extracts parameters from a face image included in each master image registered in phone directory table 12a, and performs matching between parameters of each master image and parameters of the face image extracted from the image. Then, control module 11 specifies a person corresponding to a master image having a matching ratio exceeding a predetermined threshold as a person included in the image. Control module 11 specifies all of persons included in the image.

Control module 11 displays a browsing screen on display surface 3 (S106). As shown in FIG. 7(*b*), the browsing screen includes an image 102 obtained from the image file by selection of a user and a selection object 103.

Control module 11 displays on each face image a rectangular frame 104 indicating that a face image is recognized, and obtains a name 105 corresponding to each face image from phone directory table 12a to display it near an upper part of each face image (S107). Frame 104 and name 105 are desirably deleted from the browsing screen when a predetermined time has passed after displaying or when a predetermined operation is performed.

It should be noted that, before thumbnail 101 is selected (S102: NO), when a returning operation, in other words, an operation of pressing back key 6c is performed (S108: YES), control module 11 terminates the image transmission/edition processing and closes the list screen.

Control module 11 determines whether or not an operation, for example, a tap operation is performed with respect to selection object 103 on the browsing screen (S109). When control module 11 determines that selection object 103 was operated (S109: YES), it displays a menu selection dialogue 106 on the browsing screen (S110). As shown in FIG. 7(c), menu selection dialogue 106 is constituted of three menus 106a of "MESSAGE," "BLUETOOTH," and "EDIT."

When the returning operation (pressing back key 6c) is performed (S111: YES) without operating selection object 103 (S109: NO), control module 11 closes the browsing screen and again displays the list screen on display surface 3 (S101).

When a user attaches image 102 of the browsing screen to an electronic mail and transmits the same, the user selects menu 106a of "MESSAGE" in menu selection dialogue 106. When the user transmits image 102 by means of Bluetooth, the user selects menu 106a of "BLUETOOTH." Moreover, when the user would like to change a registered image in phone directory table 12a to image 102 of the browsing screen, the user selects menu 106a of "EDIT."

When any menu 106a is selected (S112: YES), control module 11 determines which of three menus 106a was selected (S113). When menu 106a of "MESSAGE" was selected (S113: MESSAGE TRANSMISSION), control module 11 executes the message transmission processing (S114). When menu 106a of "BLUETOOTH" was selected (S113: Bluetooth TRANSMISSION), control module 11 executes the Bluetooth transmission processing (S115). When menu 106a of "EDIT" was selected (S113: IMAGE EDITION), control module 11 executes the image edition processing (S116).

It should be noted that, when a deleting operation, for example, an operation of pressing back key 6c is performed (S117: YES) without selecting menu 106a (S112: NO), control module 11 deletes menu selection dialogue 106 from the browsing screen (S118).

Referring to FIGS. 6 and 7, the message transmission processing will be described.

As shown in FIG. 7(c), when menu 106a of "MESSAGE" is selected, the message transmission processing is started. Control module 11 (first extraction module 32) extracts mail addresses related to all of persons included in image 102 from phone directory table 12a (S201). When a mail address of a person included in image 102 is not registered in phone directory table 12a, a mail address related to that person is not extracted.

Next, control module 11 (second extraction module 33) extracts a mail address of a person belonging to the same group in photo directory table 12a as a person who is closest to a center of image 102 from phone directory table 12a (S202). For example, when a group to which the person who is closest to the center of image 102 is "friend," a mail address related to a person who belongs to the group of "friend" is extracted.

In order to allow a user to select any mail address from all of mail addresses extracted from phone directory table 12a, control module 11 (selection display executing module 34) displays address selection dialogue 107 in place of menu selection dialogue 106 on the browsing screen (S203).

As shown in FIG. 7(d), address selection dialogue 107 is constituted of an address candidate 107a corresponding to each mail address and a confirmation button 107b. Each address candidate 107a is provided with a check box 107c, and a name 107d of a person having each mail address is displayed. Address candidate 107a of address selection dialogue 107 includes not only a mail address related to a person included in image 102 but also a mail address of a person having a predetermined relationship with a person included in image 102, which is herein a person belonging to the same group as a person who is closest to a center of image 102.

A user selects a desired address candidate 107a from address selection dialogue 107 by the tap operation.

When any address candidate 107a is selected (S204: YES), control module 11 sets a mail address corresponding to selected address candidate 107a as a destination mail address of image 102 (S205). As shown in FIG. 7(e), control module 11 displays a check mark on check box 107c of selected address candidate 107a.

Control module 11 determines whether or not a confirmation operation, in other words, a tap operation with respect to confirmation button 107b was performed (S206). When the selection of address candidate 107a was completed, a user performs the tap operation with respect to confirmation button 107b as shown in FIG. 7(e).

When it is determined that the confirmation operation was performed (S206: YES), control module 11 determines whether or not a mail address is set (S207). When a mail address is not set (S207: NO), control module 11 informs that a mail address is not set (S208). For example, control module 11 displays on the browsing screen a message that a mail address is not set.

When at least one electronic mail address is set (S207: YES), control module 11 (transmission processing executing module 35) displays on display surface 3 a mail creating screen for an electronic mail (S209). At this time, as shown in FIG. 7(f), control module 11 (transmission processing executing module 35) inputs all of set mail addresses to an address input area R1. Further, control module 11 (transmission processing executing module 35) attaches image 102 to this electronic mail and displays in an attachment region R4 thumbnail 101 corresponding to attached image 102. Accordingly, the message transmission processing is terminated.

After that, in accordance with a predetermined input operation performed by a user, a title is inputted to a title region R2, and a mail main body is inputted to a main body region R3, respectively. Then, when a predetermined transmission operation is performed by a user, image 102 in a state of being attached to an electronic mail is transmitted to a communication device having the inputted mail address.

It should be noted that, when a deleting operation, for example, an operation of pressing back key 6c is performed without performing the confirmation operation (S210: YES), control module 11 deletes address selection dialogue 107 (S211) and terminates the message transmission processing.

Referring to FIGS. 8 and 9, the Bluetooth transmission processing will be described.

As shown in FIG. 9(a), when menu 106a of "BLUETOOTH" is selected, the Bluetooth transmission processing is started. Control module 11 (first extraction module 32)

extracts pass keys related to all of persons included in image 102 from phone directory table 12a (S301). When a pass key of a person included in image 102 is not registered in phone directory table 12a, a pass key related to that person is not extracted.

Next, control module 11 (second extraction module 33) extracts a pass key of a person belonging to the same group (for example, "friend") in phone directory table 12a as a person closest to a center of image 102 from phone directory table 12a (S302).

Control module 11 (selection display executing module 34) displays on the browsing screen address selection dialogue 108 to allow a user to select any pass key from all of pass keys extracted from phone directory table 12a (S303).

As shown in FIG. 9(b), address selection dialogue 108 has a similar configuration as address selection dialogue 107 in the message transmission processing, and it is constituted of an address candidate 108a corresponding to each pass key and a confirmation button 108b. Each address candidate 108a includes display of a check box 108c and a name 108d of a person having each pass key. Address candidate 108a of address selection dialogue 108 includes not only a pass key related to a person included in image 102 but also a pass key related to a person having a predetermined relationship with the person included in image 102, which is herein a person belonging to the same group as a person who is closest to a center of image 102.

As shown in FIG. 9(c), a user selects a desired address candidate 108a from address selection dialogue 108 and performs a confirmation operation.

When any address candidate 108a is selected (S304: YES), control module 11 sets a pass key corresponding to selected address candidate 108a as a pass key of a destination of image 102 (S305). When it is determined that the confirmation operation (pressing confirmation button 108b) is performed (S306: YES), control module 11 determines whether or not a pass key is set (S307). When a pass key is not set (S307: NO), control module 11 informs that a pass key is not set in a manner similar to that of the message transmission processing (S308).

When at least one pass key is set (S307: YES), control module 11 (transmission processing executing module 35) transmits image 102 to a communication device having the set pass key by means of Bluetooth (S309). As shown in FIG. 9(d), control module 11 (transmission processing executing module 35) displays a transmission screen on display surface 3 during transmission by means of Bluetooth. For example, the transmission screen includes a transmission window 109 on which a progress bar 109a indicating a progress of transmission and a message 109b notifying that transmission of image 102 to a person corresponding to the selected pass key is performed. When the transmission of image 102 is completed, the Bluetooth transmission processing is terminated.

It should be noted that, when the deleting operation is performed (S310: YES) without performing the confirmation operation, control module 11 deletes address selection dialogue 108 (S311) and terminates the Bluetooth transmission processing.

Referring to FIGS. 10 and 11, the image edition processing will be described.

As shown in FIG. 11(a), when menu 106a of "EDIT" is selected, the image edition processing is started. Control module 11 extracts registered images related to all of persons included in image 102 from phone directory table 12a (S401). When a registered image of a person included in image 102 is not registered in phone directory table 12a, a registered image related to that person is not extracted.

Next, in order to allow a user to select any image from all of registered images extracted from phone directory table 12a, control module 11 displays image selection dialogue 110 on the browsing screen (S402).

As shown in FIG. 11(b), image selection dialogue 110 is constituted of a change candidate 110a corresponding to each registered image and a confirmation button 110b. Each change candidate 110a includes a check box 110c and a name 110d of a person of each registered image. As shown in FIG. 11(c), a user selects desired change candidate 110a from image selection dialogue 110 and performs a confirmation operation.

When any change candidate 110a is selected (S403: YES), control module 11 sets a registered image corresponding to selected change candidate 110a as a changed subject (S404). When it is determined that the confirmation operation (pressing confirmation button 110b) is performed (S405: YES), control module 11 determines whether or not a changed subject is set (S406). When a changed subject is not set (S406: NO), control module 11 informs that a changed subject is not set in a manner similar to that of the message transmission processing (S407).

When at least one changed subject is set (S406: YES), control module 11 changes a registered image which is set as a changed subject to image 102 (S408). In other words, control module 11 registers image 102 in place of the registered image of the changed subject to phone directory table 12a. As shown in FIG. 11(d), control module 11 displays on display surface 3 for a certain time period a notification window 111 notifying that a registered image is changed.

It should be noted that, when the deleting operation is performed without performing the confirmation operation (S409: YES), control module 11 deletes image selection dialogue 110 (S410) and terminates the image edition processing.

As shown in FIG. 5, when the message transmission processing, Bluetooth transmission processing, or image edition processing is terminated, and the termination of the processing is not made by the deleting operation (S119: NO), control module 11 terminates the image transmission/edition processing. On the other hand, when the termination of the message transmission processing, Bluetooth transmission processing, or image edition processing is made by the deleting operation (S119: NO), control module 11 returns to the processing of Step S109 and monitors the operation with respect to selection object 103.

As described above, according to one embodiment, when image 102 is selected by a user, address information (a mail address, a pass key) related to a person included in image 102 and address information related to a person having a predetermined relationship (a person belonging to the same group) with a person included in image 102 are extracted as an address candidate and displayed on display surface 3. Accordingly, useful address information is automatically provided as an address candidate to a user based on the image including the person. Therefore, a user can select address information of a desired person from address candidates to transmit an image to a desired person in a simple manner.

Further, according to one embodiment, image 102 is selected by a user, so that a registered image related to a person included in image 102 is extracted as a change candidate and displayed on display surface 3. A user can select a desired registered image from the provided change candidates to change the registered image to image 102. Accordingly, a user can change the registered image by a simple operation.

Modified Example 1

In the embodiment described above, a person belonging to the same group in phone directory table 12a as a person included in image 102 is set as a person having a predetermined relationship with a person included in image 102, and address information (a mail address, a pass key) related to the person is extracted by second extraction module 33.

In modified example 1, as will be described in the following, a person who is often included as an address in electronic mails communicated between a user and a person included in image 102 is set as a person related to a person included in image 102, and address information related to these persons is extracted by second extraction module 33.

Figure 12:
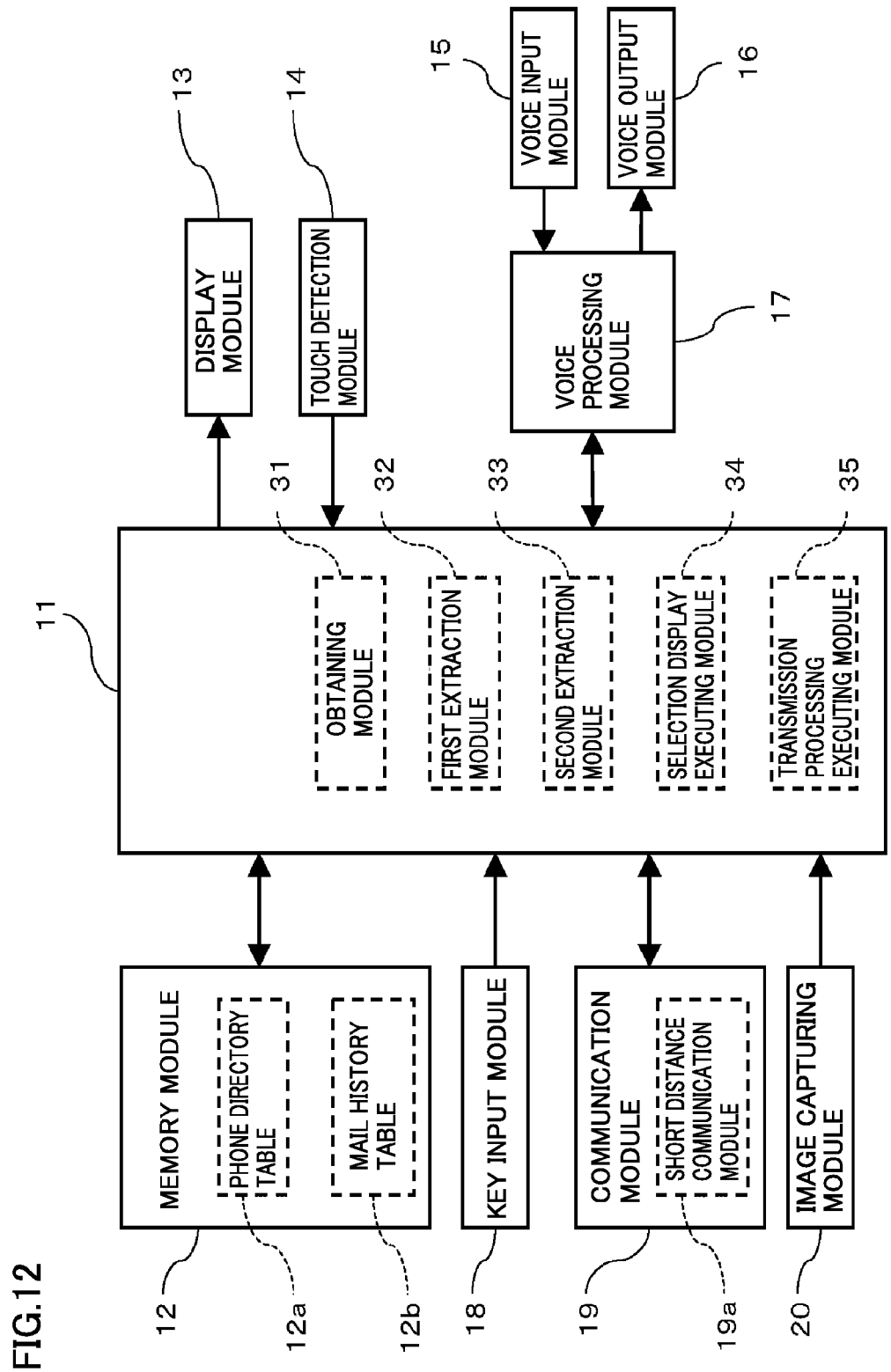
FIG. 12 is a block diagram representing an overall configuration of a mobile phone.

FIG. 12 is a block diagram representing an overall configuration of mobile phone 1 according to the present modified example.

Memory module 12 stores a mail history table 12b. Mail history table 12b stores information of electronic mails (date/time, mail address, title, main body, and the like) communicated by mobile phone 1 in a certain period of time. Other configuration of mobile phone 1 according to the present modified example is similar to the above-described embodiment.

FIG. 13(a) is a flowchart representing a message transmission processing according to the present modified example. In the message transmission processing according to the present modified example, the processing in Step S202 of the message transmission processing shown in FIG. 6 is replaced with the processing of Step S222. Other processing is similar to those of the message transmission processing shown in FIG. 6. FIG. 13(a) represents only a part of processing including the replaced processing.

In Step S222, control module 11 (second extraction module 33) extracts from phone directory table 12a a mail address related to a person included as an address at a frequency exceeding a predetermined frequency, for example, a frequency exceeding 10% in electronic mails communicated between a user (mobile phone 1) and a person (communication device owned by the person) who is closest to a center of image 102 from electronic mails stored in mail history table 12b. Specifically, control module 11 (second extraction module 33) detects a mail address included at a frequency exceeding a predetermined frequency in an electronic mail communicated between a user and a person closest to a center of image 102 and extracts from phone directory table 12a a mail address matching with the detected mail address.

In Step 203, control module 11 (selection display executing module 34) displays address selection dialogue 107. In address candidate 107a constituting address selection dialogue 107, not only a mail address related to a person included in image 102 but also a mail address related to a person included with a large number as an address in an electronic mail communicated between a user and a person closest to a center of image 102.

FIG. 13(b) is a flowchart representing a Bluetooth transmission processing according to the present modified example. In the Bluetooth transmission processing according to the present modified example, the processing of Step S302 of the Bluetooth transmission processing shown in FIG. 8 is replaced with the processing of Step S322. Other processing is the same as the Bluetooth transmission processing shown in FIG. 8. FIG. 13(b) represents only a part of processing including the replaced processing.

In the present modified example, in Step S322, control module 11 (second extraction module 33) extracts from phone directory table 12a a pass key related to a person included as an address at a frequency exceeding a predetermined frequency in an electronic mail communicated between a user and a person closest to a center of image 102 from electronic mails stored in mail history table 12b. Specifically, control module 11 (second extraction module 33) detects a mail address included at a frequency exceeding a predetermined frequency in an electronic mail communicated between a user and a person closest to a center of image 102 and extracts a pass key associated with the detected mail address from phone directory table 12a.

In Step 303, control module 11 (selection display executing module 34) displays address selection dialogue 108. Address candidate 108a constituting address selection dialogue 108 includes not only a pass key related to a person included in image 102 but also a pass key related to a person included with a large number as an address in an electronic mail communicated with a person closest to a center of image 102.

According to the modified example, similarly to the above-described embodiment, since useful address information is automatically provided as an address candidate to a user based on an image including a person, a user can transmit an image to a desired person in a simple manner by selecting address information of the desired person from address candidates.

Modified Example 2

In modified example 2, a person who belongs to the same group in phone directory table 12a as a person included in image 102 and who is often included as an address in an electronic mail communicated between a user and a person included in image 102 is set as a person having a predetermined relationship with a person included in image 102, and address information related to the person is extracted by second extraction module 33.

In the present modified example, similarly to modified example 1, mail history table 12b is stored in memory module 12.

FIG. 14(a) is a flowchart representing a message transmission processing according to the present modified example. In the message transmission processing according to the present modified example, the processing of Step S202 in the message transmission processing shown in FIG. 6 is replaced with the processing of Steps S232 through S234. Other processing is the same as the message transmission processing shown in FIG. 6.

Control module 11 (second extraction module 33) sets a mail address of a person belonging to the same group in phone directory table 12 as a person closest to a center of image 102 to be a first candidate (S232). Further, control module 11 (second extraction module 33) sets a mail address related to a person included as an address at a frequency exceeding a predetermined frequency in an electronic mail communicated between a user and a person closest to a center of image 102 in electronic mails stored in mail history table 12b to be a second candidate (S233). Then, control module 11 (second extraction module 33) extracts a mail address included in both the first candidate and the second candidate from phone directory table 12a (S234).

Address candidate 107a of address selection dialogue 107 displayed in Step S203 includes not only a mail address related to a person included in image 102 but also a person who belongs to the same group in phone directory table 12*a* as a person included in image 102 and who is often included as an address in an electronic mail communicated between a user and a person included in image 102.

FIG. 14(*b*) is a flowchart representing a Bluetooth transmission processing according to the present modified example. In the Bluetooth transmission processing according to the present modified example, the processing of Step S302 of the Bluetooth transmission processing shown in FIG. 8 is replaced with the processing of Steps S332 through S334. Other processing is the same as the Bluetooth transmission processing shown in FIG. 8.

Control module 11 (second extraction module 33) sets a pass key of a person belonging to the same group in phone directory table 12*a* as a person closest to a center of image 102 to be a first candidate (S332). Further, control module 11 (second extraction module 33) sets a pass key related to a person included as an address at a frequency exceeding a predetermined frequency in an electronic mail communicated between a user and a person closest to a center of image 102 in electronic mails stored in mail history table 12*b* as a second candidate (S333). Then, control module 11 (second extraction module 33) extracts from phone directory table 12*a* a pass key included in both the first candidate and the second candidate (S334).

Address candidate 108*a* of address selection dialogue 108 displayed in Step 303 includes not only a pass key related to a person included in image 102 but also a person who belongs to the same group in phone directory table 12*a* as a person included in image 102 and who is often included as an address in an electronic mail communicated between a user and a person included in image 102.

According to the present modified example, address information related to a person having a close relationship with a person included in image 102 can be provided as an address candidate to a user.

Modified Example 3

In modified example 3, a person belonging to the same group in phone directory table 12*a* as a person included in image 102 or a person often included as an address in an electronic mail communicated between a user and a person included in image 102 is set as a person having a predetermined relationship with a person included in image 102, and address information related to the person is extracted by second extraction module 33.

In the present modified example, as with modified example 1, memory module 12 stores mail history table 12*b*.

FIG. 15(*a*) is a flowchart representing a message transmission processing according to the present modified example. In the present modified example, the processing of Step 244 is executed in place of the processing of Step S234 of modified example 2, and a mail address included in a first candidate and a second candidate is extracted from phone directory table 12*a* by control module 11 (second extraction module 33).

Address candidate 107*a* of address selection dialogue 107 displayed in Step 203 includes not only a mail address related to a person included in image 102 but also a person belonging to the same group in phone directory table 12*a* as a person included in image 102 or a mail address related to a person often included as an address in an electronic mail communicated between a user and a person included in image 102.

FIG. 15(*b*) is a flowchart representing the Bluetooth transmission processing according to the present modified example. In the present modified example, in place of the processing of Step S334 of modified example 2, the processing of Step 344 is executed, and a pass key included in the first candidate or second candidate is extracted from phone directory table 12*a* by control module 11 (second extraction module 33).

Address candidate 108*a* of address selection dialogue 108 shown in step 303 includes not only a pass key related to a person included in image 102 but also a pass key related to a person belonging to the same group in phone directory table 12*a* as a person included in image 102 or a person often included as an address in an electronic mail communicated between a user and a person included in image 102.

According to the present modified example, address information related to a person having a wide connection with a person included in image 102 can be provided to a user as an address candidate.

<Other>

An embodiment of the present disclosure was described above. However, the present disclosure is not limited by the above-described embodiment, and the embodiment of the present disclosure can be modified in various ways other than those described above.

For example, in the above-described embodiment and in modified examples 1 and 3, address information (a mail address, a pass key) related to a person having a predetermined relationship with a person closest to a center of image 102 is extracted from phone directory table 12*a*. However, not limited to a person at a center of image 102, address information related to a person having a predetermined relationship with a person at other position or all of persons may be extracted from phone directory table 12*a*.

Further, in the above-described embodiment, an electronic mail is utilized for transmission of image 102 selected from a list screen, and a mail address is extracted from phone directory table 12*a* by means of first extraction module 32 and second extraction module 33, and a mail creating screen of an electronic mail is displayed by transmission processing executing module 35. However, in place of an electronic mail, an SMS (Short Message Service) may be utilized. In this case, a phone number is extracted from phone directory table 12*a* by means of first extraction module 32 and second extraction module 33, and a mail creating screen of SMS is displayed by transmission processing executing module 35.

Further, when a mail address of a person included in image 102 or of a person having a predetermined relationship is registered in phone directory table 12*a*, control module 11 may extract a mail address and display a mail creating screen of an electronic mail on display surface 3. When a mail address is not registered, control module 11 may extract a phone number and display a mail creating screen of SMS on display surface 3. On the contrary, when a phone number of a person included in image 102 or of a person having a predetermined relationship is registered in phone directory table 12*a*, control module 11 may extract the phone number and display a mail creating screen of SMS on display surface 3. When the phone number is not registered, control module 11 may extract a mail address and display a mail creating screen of an electronic mail on display surface 3.

Further, in the above-described embodiment, the communication by means of Bluetooth is employed as a short distance wireless communication. However, other short distance wireless communication such as an infrared ray communication may be employed. For example, when the infrared ray communication is employed, an authentication number for specifying a communicated device (mobile phone) of the infrared ray communication is registered as address information in phone directory table 12a.

Further, in the above-described embodiment, control module 11 displays on display surface 3 a browsing screen having a stack of address selection dialogues 107 as a selection screen. However, control module 11 may display on display surface 3 a screen consisting of a list of address candidates as a selection screen in place of the browsing screen.

Further, in the above-described embodiment, a master image is stored in phone directory table 12a, and control module 11 extracts a parameter from a face image included in the master image. However, a parameter extracted from a face image included in a master image may be registered in phone directory table 12a. In this case, when matching is performed, control module 11 obtains a parameter from phone directory table 12a.

In the above-described embodiment, contact information including person information and address information is stored in memory module 12 of mobile phone 1. However, it may be stored in an external memory module such as a server.

The present disclosure is applicable not only to a mobile phone but also to various mobile terminal devices such as a PDA (Personal Digital Assistant), a tablet PC, and the like.

Additionally, the embodiment of the present disclosure can be modified in various manners as needed within the technical idea recited in claims.

The invention claimed is:

1. A mobile terminal device comprising:
   a display;
   a memory that stores address information for each of a plurality of people; and
   at least one processor configured to, for a given image,
      extract first address information corresponding to at least one first person, included in the image, from the memory,
      extract second address information corresponding to at least one second person, who is different than the at least one first person and is not included in the image, but who has a predetermined relationship with the at least one first person, and
      display on the display a selection screen for selection of at least one address information from the first address information and the second address information.

2. The mobile terminal device according to claim 1, wherein the memory stores a face image for one or more of the plurality of people, and the at least one processor identifies the at least one first person by comparing a face image detected in the image to one or more face images stored in the memory.

3. The mobile terminal device according to claim 2, wherein the at least one processor is further configured to transmit the image to the at least one address information selected from the selection screen.

4. The mobile terminal device according to claim 3, wherein before transmitting the image, the at least one processor is further configured to display on the display a message creating screen, to which the selected at least one address information is inputted, for creating a message to which the image is attached.

5. The mobile terminal device according to claim 3, wherein the at least one processor transmits the image to the selected at least one address information through short distance wireless communication.

6. The mobile terminal device according to claim 1, wherein the predetermined relationship comprises the at least one second person being associated with a same group as the at least one first person.

7. The mobile terminal device according to claim 1, wherein the predetermined relationship comprises the at least one second person being associated with a same communication as the at least one first person at a frequency exceeding a predetermined frequency.

8. A method for controlling a mobile terminal device including a display, the method comprising by at least one processor of the mobile terminal device:
   storing address information for each of a plurality of people in memory; and,
   for a given image,
      extracting first address information corresponding to at least one first person, included in the image, from the memory,
      extracting second address information corresponding to at least one second person, who is different than the at least one first person and is not included in the image, but who has a predetermined relationship with the at least one first person, and
      displaying on the display a selection screen for selection of at least one address information from the first address information and the second address information.

9. A non-transitory computer-readable medium having a program stored thereon for allowing a computer to:
   store address information for each of a plurality of people in memory; and,
   for a given image,
      extract first address information corresponding to at least one first person, included in the image, from the memory,
      extract second address information corresponding to at least one second person, who is different than the at least one first person and is not included in the image, but who has a predetermined relationship with the at least one first person, and
      display on the display a selection screen for selection of at least one address information from the first address information and the second address information.

* * * * *